May 24, 1960  J. L. SAUNDERSON ET AL  2,937,561
SPECTROSCOPIC APPARATUS

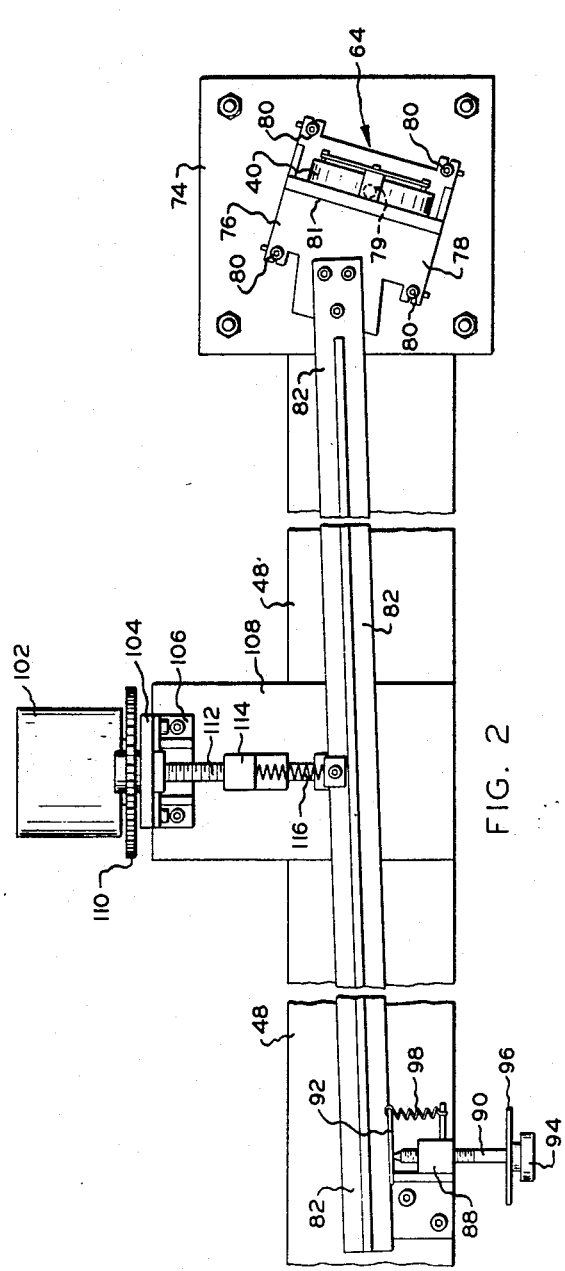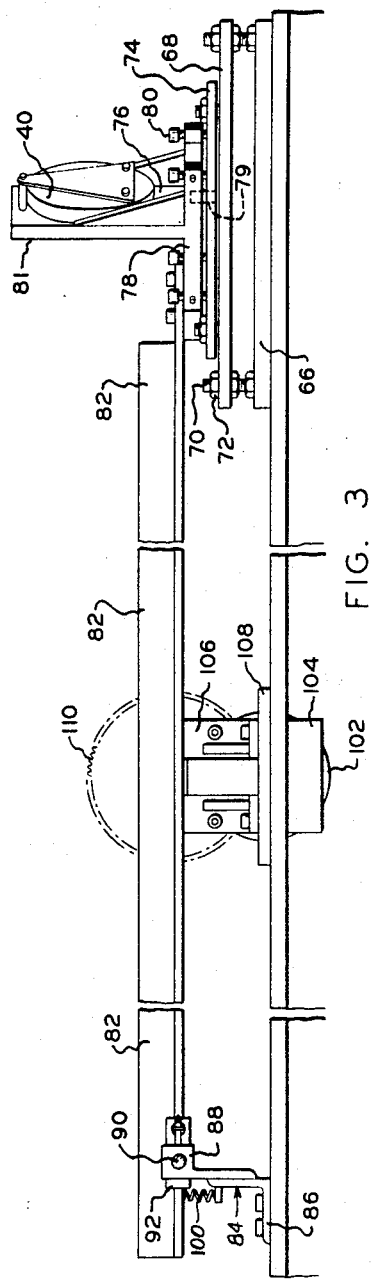

Filed Sept. 24, 1956  5 Sheets-Sheet 3

INVENTORS
Jason L. Saunderson
BY Eliot DuBois
Gerald Altman
ATTORNEY

United States Patent Office 2,937,561
Patented May 24, 1960

2,937,561

SPECTROSCOPIC APPARATUS

Jason L. Saunderson, Lexington, and Eliot Du Bois, Lincoln, Mass., assignors to Baird-Atomic, Inc., a corporation of Massachusetts Filed Sept. 24, 1956, Ser. No. 611,497

15 Claims. (Cl. 88—14)

The present invention relates to spectrum analysis and, more particularly, to spectrometers of the so-called "direct reading" type which automatically indicate the chemical composition of a specimen by determining the intensity distribution of radiation of characteristic wave lengths emitted by the specimen under excitation.

By way of example, a typical direct reading spectrometer comprises an entrance slit that transmits radiation from an electrically excited specimen, a diffraction grating that forms a spectrum from radiation so transmitted, and a plurality of exit slits that transmit radiation of preselected wave lengths to photocells in order to determine the differing intensities of the radiation at these wave lengths. In such a spectrometer the spacial relationships among the entrance slit, the grating and the exit slits are so critical that minor changes in ambient temperature, for example, may cause their misalignment and, in consequence, a spectrum shift capable of introducing errors into the determination of intensities.

The present invention contemplates the automatic correction of any such misalignment with unprecedented precision and dependability by a novel automatic servo-system that is photo-electrically controlled by what may be termed "monitor radiation" from a source other than the excited sample. This monitor radiation, which like radiation from the excited specimen, is diffracted by the grating, is transmitted by entrance and exit slits to the servo-system. The physical construction is such that misalignment among the grating and the entrance and exit slits for the radiation from the excited specimen will be accompanied by similar misalignment among the grating and the entrance and exit slits for the monitor radiation.

The present application is a continuation in part of patent application Serial No. 488,786 filed on February 17, 1955 in the names of Jason L. Saunderson and Eliot Du Bois for "Automatic Spectrometer Apparatus and Method" now Patent No. 2,837,959 issued on June 10, 1958.

Objects of the present invention are: to provide a servo-system of the foregoing type which includes a balancing circuit that is responsive to monitor radiation in the form of two beams of radiation that are produced by a single envelope gas discharge tube possessing two alternately bright radiating regions; to provide a spectrometer of the foregoing type in which the optical paths of beams from the excited specimen and from the source of monitor radiation are substantially distinct; and to provide a spectrometer of the foregoing type in which the grating is carried by a substantially stationary mount that is kept properly oriented by a force exerted by the servo-system.

Other objects of the present invention will in part be obvious and will in part appear hereinafter.

The invention accordingly comprises the apparatus possessing the features, properties and relation of components that are exemplified in the following detailed disclosure, the scope of which will be indicated in the appended claims.

For a fuller understanding of the nature and objects of the present invention, reference should be had to the following detailed description taken in connection with the accompanying drawings wherein:

Fig. 2 is a fragmentary plan view showing details of the components of Fig. 1;

Fig. 3 is a fragmentary elevation view of the components of Fig. 2;

Figure 4:
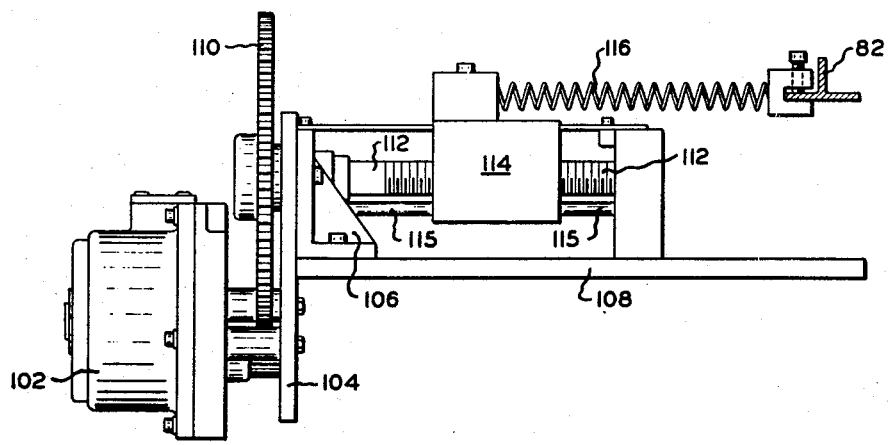
Fig. 4 is an enlarged side elevation of a component of Figs. 1, 2 and 3, including a servo-motor.
Figure 5:
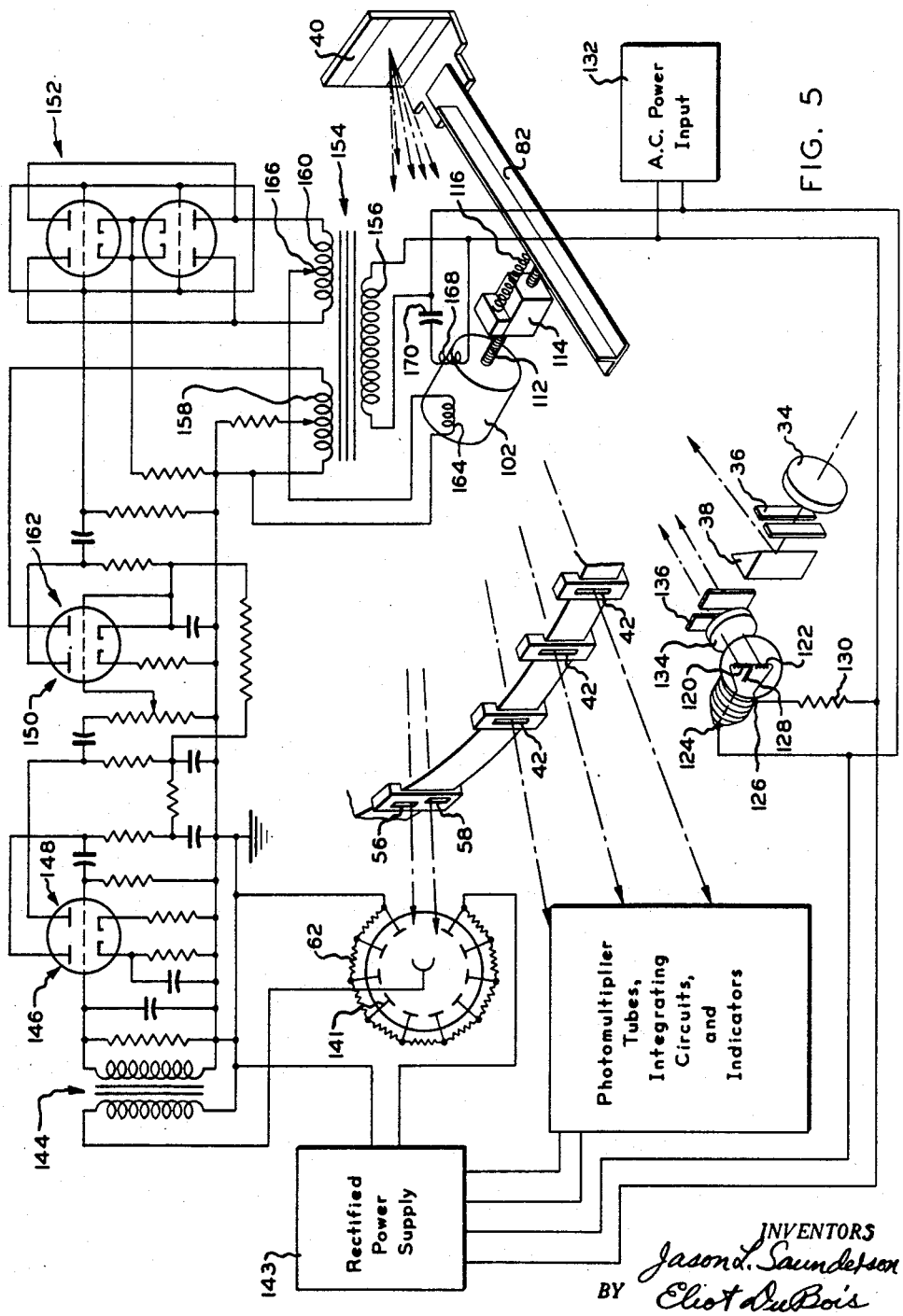
Fig. 5 is a schematic diagram of a preferred servo-system incorporating components of Figs. 1 through 4.
Figure 6:
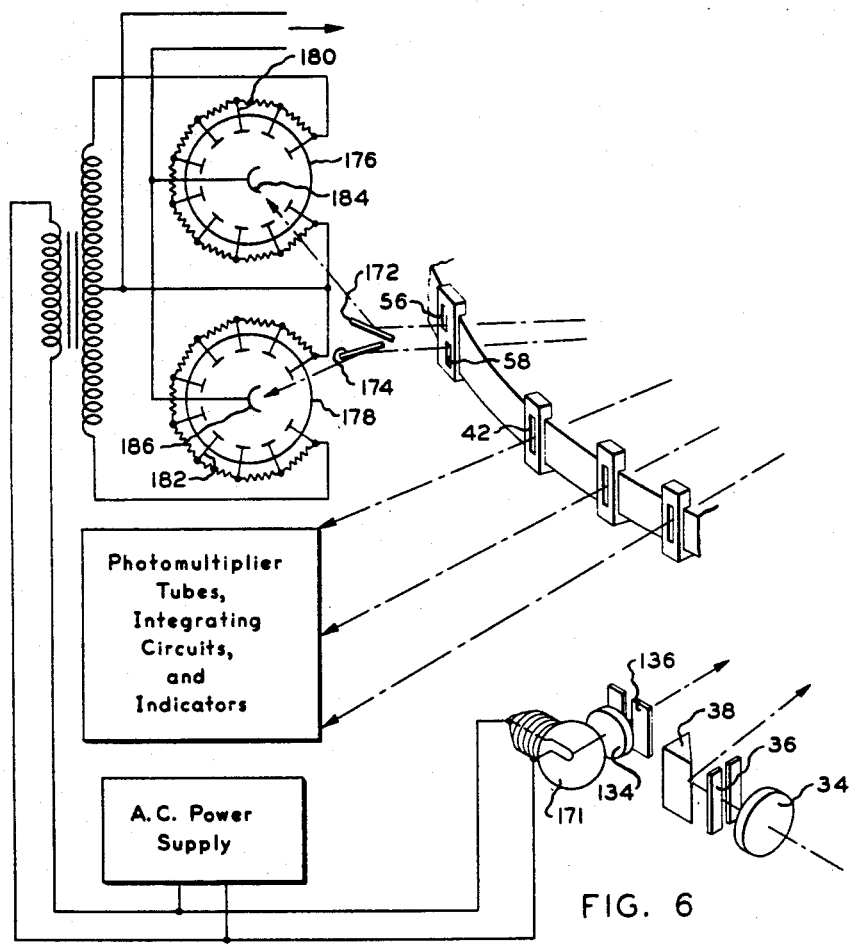
Figure 7:
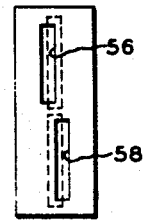
Figure 8:
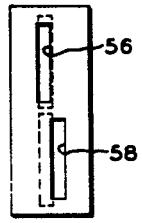

Fig. 6 is a schematic diagram of an alternative servo-system incorporating components of Figs. 1 through 4; and Figs. 7, 8, 9 and 10, of which Figs. 7 and 8 are similar for explanatory purposes, are plan views of alternative embodiments of one of the components incorporated in the servo-systems of Figs. 5 and 6.

Figure 1:
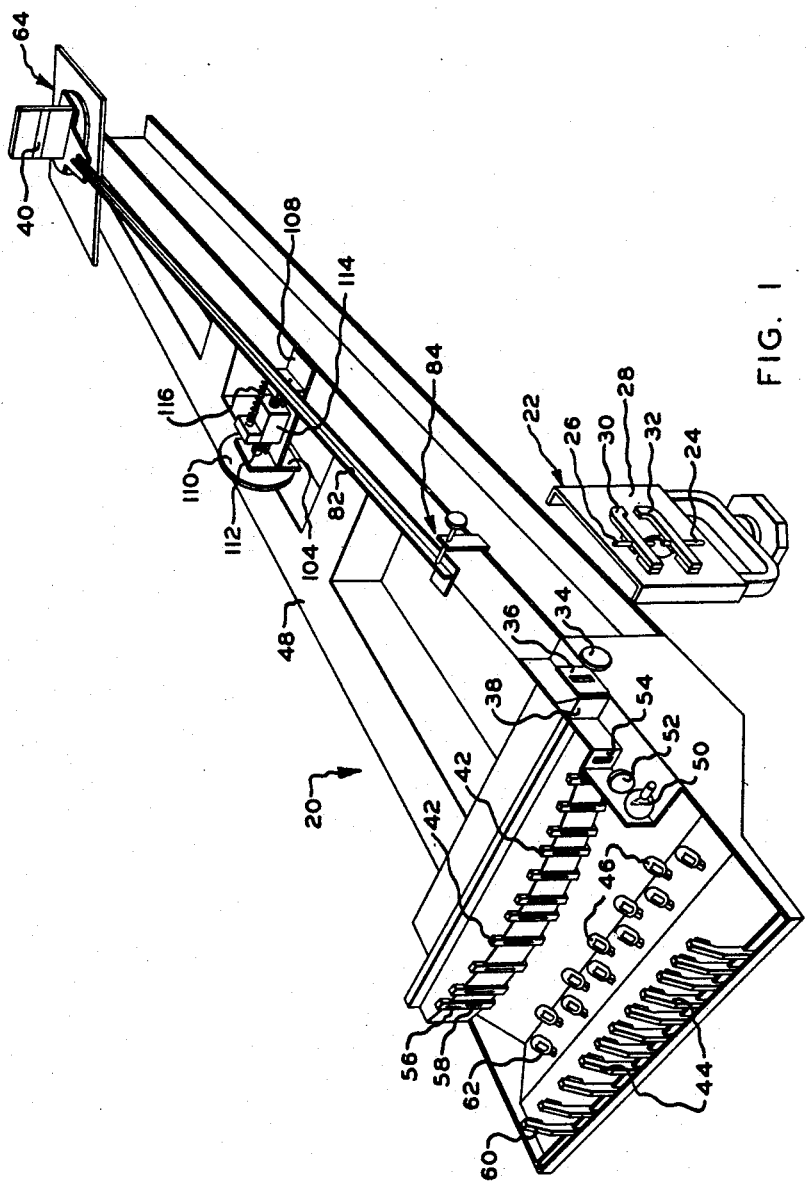
Figure 1 is a perspective view of significant components of a spectrometer embodying the present invention, these components normally being enclosed within a light-tight housing (not shown)

The mechanical components of the preferred spectrometer of Figs. 1 through 5 are generally indicated at 20 in Fig. 1. These components in operation are enclosed within a housing which shields its interior from ambient radiation capable of affecting the system now to be described. This system serves to indicate the chemical composition of a specimen by determining the intensity distribution, at selected wave lengths, of radiation emitted by the specimen under excitation in an arc mount assembly 22. In conventional fashion, arc mount assembly 22 comprises a pair of electrodes 24 and 26, for example, in the form of two pins composed of the specimen material. Electrodes 24 and 26 are retained in predetermined relative axial positions on a mount 28 by a pair of clamps 30 and 32. Associated with arc mount assembly 22 is a circuit (not shown) for generating a suitable voltage across the gap between inner ends of electrodes 24 and 26 in order to produce an electrical discharge that is accompanied by characteristic radiation from the specimen. The gap between the inner ends of electrodes 24 and 26 is imaged by a lens 34, a slit 36 and a mirror 38 on a concave diffraction grating 40 in order to produce a spectrum. Preselected portions (which may be thought of loosely as preselected lines) of this spectrum are directed through respective exit slits 42 and are reflected by mirrors 44 to respective photomultiplier tubes 46. The intensities of these spectrum lines are indicated by these photomultiplier tubes in association with appropriate integrating circuits (not shown).

In order to minimize even slight disturbances of the spacial relationship among the various aforementioned components, they are mounted on a sturdy A-shaped frame 48 having intersecting longitudinal legs and short cross pieces constructed from heavy gauge channel stock. Nevertheless, because of the relatively great distance between the grating at one end of the A-frame and the entrance and exit slits at the other end, small temperature changes tend to disorient the grating with respect to the entrance and exit slits. In accordance with the present invention, proper orientation is assured by an automatic servo-system now to be described. This servo-system is photo-electrically controlled by monitor radiation in the form of two beams of radiation that are produced by a gas discharge tube 50 possessing upper and lower alternately bright radiating regions. These two beams are directed through a focusing lens 52 and a slit 54 toward grating 40. Grating 40 directs these beams back through slightly offset upper and lower exit slits 56 and 58 (Figs. 5 and 7) respectively, to a mirror 60 and a photomultiplier tube 62. Normally, the servo-system is adjusted so that when the grating is properly oriented, the upper and lower beams as shown in dotted lines in Fig. 7 are transmitted in equal intensity through slits 56 and 58, respectively. But when the grating becomes improperly oriented, more of one of the beams and less of the other are transmitted through their respective slits. For example, a slight disorientation of the grating might cause the upper and lower beams to move to the left, as viewed in Fig. 8, so that the intensity of the beam transmitted through the upper slit would be greater than the intensity of the beam transmitted through the lower slit. Here the resulting imbalance operates to reorient the grating by means of the circuit and mechanism to be described below in reference to Fig. 6.

The mechanical components of the servo-system, as shown in Figs. 2, 3 and 4 (enlarged) include a mount, generally designated by 64, which carries grating 40 in substantially fixed position at the apex of an A-frame 48. This mount includes a pair of base plates 66 and 68 secured to each other in adjustable parallelism by tie bolts 70 and lock nuts 72. Secured to plate 68 is a circular bearing plate 74 that carries a grating frame 76. Frame 76 includes a horizontal portion 78 provided at its center with screw 79 that ties it to bearing plate 74, at its four corners with fine adjustment screws 80, and a vertical portion 81 having an opening through which radiation is transmitted to grating 40 secured to its back face.

Control of the grating's orientation about a vertical axis is exerted by an elongated lever 82, one end of which is secured by screws to horizontal portion 78, and the other end of which is secured to a manually adjustable bracket 84. Bracket 84 includes an angle member 86 that is secured to a leg of A-frame 40 and that carries an internally threaded thimble 88. Projecting through thimble 88 is a centrally threaded shaft 90 that is turned into thimble 88. The inner end of shaft 90 abuts against a bearing plate 92 that is affixed to lever 82. For the purpose of initially aligning the grating, the outer end of shaft 90 has a manually adjustable knob 94 and a circular dial 96 that in conjunction with a pointer (not shown) indicates the shaft's rotational position. Springs 98 and 100, connected respectively between bearing plate 92 and thimble 88, and between lever 82 and bracket 86 minimize undesired movement of the free end of lever 82.

A servo-motor 102 is carried by a vertical plate 104 which abuts against the inner edge of a leg of A-frame 40 and which is secured by means of a bracket 106 to a horizontal plate 108 that rests on the upper face of this leg. Motor 102 drives a gear 110 that is keyed to the inner end of a threaded shaft 112. Carried by shaft 112 is an internally-threaded block 114 that rides along a keyway 115 in one direction or the other in response to rotation of the shaft. A coil spring 116, connected between block 114 and lever 82, exerts a shock-free force on lever 82 that balances the force exerted on lever 82 by the inner end of manually set shaft 90 in order to maintain proper orientation of the grating. Servo-motor 102 is controlled by the servo-circuit now to be described in reference to Fig. 5.

As indicated above, radiation from the excited specimen under analysis is directed through lens 34 and entrance slit 36, is reflected by mirror 38, and is diffracted by grating 40 toward plurality of exit slits 42. Because of the relatively great distance between grating 40 and entrance and exit slits 36 and 42, slight ambient temperature changes are capable of disorienting the grating.

The servo-system shown schematically in Fig. 5 is photoelectrically controlled by monitor radiation in the form of two beams that are produced by gas discharge tube 50 containing mercury vapor and possessing upper and lower filaments 120 and 122. These filaments are connected in series across a pair of terminals 124 and 126 and are centrally supported at their junction by a rod 128. An alternating current applied across the filaments in series produces instantaneous differences in potential between the filaments. At any instant if the difference is great enough, the mercury vapor breaks down to create an electron flow in parallel with the connection between the filaments. This electron flow gives rise to cathode glow in the vicinity of the instantaneous cathode. Gas discharge tubes of various other designs may be alternatively employed, it being only necessary that their vapor pressure and mechanical construction be adjusted to give rise to two alternate sources of radiation when subjected to an appropriate alternating voltage. As shown, this alternating voltage is supplied through a ballast resistor 130 from a power supply 132.

The upper and lower beams of monitor radiation emitted by tube 50, as indicated by the black arrows, are directed through a focusing lens 134 and a slit 136 to grating 40 which diffracts them respectively through slightly offset upper and lower slits 56 and 58. Since the slits are offset, as indicated above there is one orientation of the beams at which the amount of radiation directed through the upper slit is exactly equal to the amount of radiation transmitted through the lower slit. If the beams are in any other orientation, either the radiation transmitted through the lower slit or the radiation transmitted through the upper slit will be greater in intensity. Photomultiplier tube 62 includes dynodes 141 under steady voltages applied by a rectified power supply 143, and a collector anode. In response to the two beams, photomultiplier tube 62 generates a succession of electrical pulses which are equal in magnitude when the beams are properly oriented and alternate pulses of which are unequal in magnitude when the beams are improperly oriented. The collector anode of photomultiplier tube 62 is connected through an input transformer 144 to three amplifier stages 146, 148 and 150 and a push-pull power stage 152. These stages are energized by power supply 132 through a transformer 154 having a primary winding 156. A pair of secondary windings 158 and 160 supply, respectively, a rectifier stage 162 that polarizes amplifier stages 146, 148 and 150 and the aforementioned power stage 152. One winding 164 of servo-motor 102, which is of the split-phase induction type, is connected between an appropriate intermediate point 166 of secondary winding 160 and ground. The other winding 168 is connected to power supply 132 through a capacitor 170 which shifts the wave form in winding 168 into a 90° out-of-phase relationship with respect to the wave form in winding 164. The operation of the circuit is such that when the alternate pulses generated by photomultiplier tube 62 are equal in magnitude, the wave form in winding 164 will be a succession of pulses of equal amplitude, these pulses corresponding in time with the positive and negative half cycles of the input power wave form. The rotor of the motor is thereby subjected successively to equal opposite forces with the result that it remains stationary. However, when the alternate pulses from photo-multiplier tube 62 are unequal in magnitude, a similar inequality will exist in the wave form of winding 164 and the pulses of greater amplitude will correspond with either the positive or negative half cycles of the power input wave form. Because the wave form in winding 168 is 90° out-of-phase with the power input wave form, the rotor of servo-motor 102 will rotate. The direction of rotation will be determined by whether the pulse of greater amplitude in winding 164 coincides with the positive or negative half cycle of the power input wave form. This direction thus, is determined by whether the beam transmitted through slit 56 or the beam transmitted through slit 58 is of the greater intensity.

An alternative servo-system, shown schematically in Fig. 6, is controlled by monitor radiation in the form of a single beam that is diffracted by the grating. As shown, the entrance optics for radiation from the excited specimen, the mechanical arrangement for mounting and controlling the orientation of the grating, the exit optics for radiation from the excited specimen, and the circuitry for energizing the servo-motor all are similar to their counterparts in Fig. 5. Here, however, a lamp 171, in response to an applied voltage generates either a steady beam or a beam of varying intensity. This beam, after being directed through focusing lens 134 and slit 136 and diffracted by the grating, is directed through both offset slits 56 and 58. The resulting two beams then are reflected by a pair of mirrors 172 and 174, respectively, to a pair of photomultiplier tubes 176 and 178. The dynodes 180 of photomultiplier tube 176 are supplied with alternating voltage that is 180° out-of-phase with respect to the voltage supplied to the dynodes 182 of photomultiplier tube 178. The collector anodes 184 and 186 of photomultiplier tubes 176 and 178, respectively, are applied in common to the input transformer of the amplifier circuit described above in reference to Fig. 5. The power supplied to the photomultiplier tubes is of the same phase and frequency as the power supplied to the amplifier circuit. Since each photomultiplier tube is sensitive to radiation only when its dynodes are negative with respect to its anode, the signal applied to transformer 144 is of the same pulsating character as the signal applied by the single photomultiplier tube described above.

Figure 9:
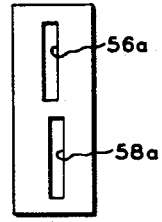
Figure 10:
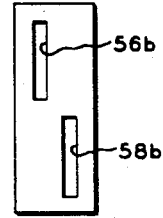

Figs. 9 and 10 illustrate alternate arrangements of slits which operate in the same manner as slits 56 and 58. In Fig. 9, slits 56a and 58a overlap the axis from which their inner edges are equally spaced. In Fig. 10, slits 56b and 58b are spaced from the axis from which their inner edges are equally spaced.

The present invention thus provides a simple but efficacious servo-system for automatically controlling the orientation of a grating or the like with respect to input and output optical components spaced therefrom.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. Spectroscopic apparatus comprising first means for exciting a chemical sample to emit characteristic radiation, second means for directing said characteristic radiation along a first optical path, third means for dispersing said characteristic radiation from said first optical path into a spectrum, fourth means for reading said spectrum, fifth means for emitting monitor radiation, sixth means for directing said monitor radiation along a second predetermined optical path to said third means, said first optical path and said second optical path being predeterminedly related, and seventh means responsive to said monitor radiation from said third means for controlling the relative orientations of said optical path, said third means and said fourth means.

2. The spectroscopic apparatus of claim 1, wherein said fifth means is a single envelope tube having a pair of alternately bright regions when subjected to an alternating voltage.

3. The spectroscopic apparatus of claim 1, wherein said seventh means includes a lever connected to said third means and operatively associated with a servo-motor that is responsive to said monitor radiation from said third means.

4. Spectroscopic apparatus comprising first means for exciting a chemical sample to emit characteristic radiation, second means for directing said characteristic radiation along a first optical path, third means for dispersing said characteristic radiation from said first optical path into a spectrum, fourth means for reading said spectrum, fifth means in the form of a gas discharge tube having a pair of alternately bright regions when subjected to alternating voltage for emitting monitor radiation, sixth means for directing said monitor radiation along a second predetermined optical path to said third means, and seventh means including a lever connected to said third means and operatively associated with a servo-motor that is responsive to said monitor radiation from said third means for controlling the relative orientations of said optical path, said third means and said fourth means.

5. In combination with spectroscopic means for dispersing incident radiation into a spectrum, a system for automatically and predeterminedly orienting said spectroscopic means with respect to spectrometer components associated therewith, said system comprising a single envelope gas discharge tube characterized by regions which emit monitor radiation of alternately greater and lesser intensity, optical means for directing said monitor radiation toward said spectroscopic means and photo-electric means for receiving said monitor radiation from said spectroscopic means, said photo-electric means, in response to the incidence of said monitor radiation, producing signals of a character that depends upon the orientation of said spectroscopic means with respect to said optical means and said photo-electric means.

6. In combination with a diffraction grating, a system for automatically and predeterminedly orienting said diffraction grating with respect to an entrance slit for radiation from a specimen under excitation and a plurality of exit slits for radiation transmitted from said entrance slit and diffracted by said diffraction grating, said system comprising a single envelope gas discharge tube characterized by regions which emit radiation of alternately greater and lesser intensity, an entrance slit for radiation from said gas discharge tube, a pair of offset exit slits for said radiation transmitted from said entrance slit for said gas discharge tube and diffracted by said diffraction grating, and photo-electric means for receiving said radiation from said offset exit slits in order to produce signals of a character that depends upon the orientation of said diffraction grating with respect to the entrance and exit slits.

7. In combination with a diffraction grating, a system for automatically and predeterminedly orienting said diffraction grating with respect to an entrance slit for radiation from a specimen under excitation and a plurality of exit slits for radiation from said entrance slit and diffracted by said diffraction grating, said system comprising a single envelope gas discharge tube characterized by regions which emit radiation of alternately greater and lesser intensity, an entrance slit for radiation from said gas discharge tube, a pair of photo-electrical elements responsive to radiation from said entrance slit for said gas discharge tube and diffracted by said diffraction grating, and photo-electrical elements for producing signals of a character that depends upon the orientation of said diffraction grating with respect to the entrance slits and the exit slits.

8. In the combination of claim 6, a lever connected to said diffraction grating, and a servo-motor operatively connected to said lever, said servo-motor being responsive to said signals.

9. In the combination of claim 7, a lever connected to said diffraction grating, and a servo-motor operatively connected to said lever, said servo-motor being responsive to said signals.

10. In combination with spectroscopic means for dispersing incident radiation into a spectrum, a system for automatically and predeterminedly orienting said spectroscopic means with respect to spectrometer components associated therewith, said system comprising a mount affixed to said base, said mount carrying said spectroscopic means, a lever having one end connected to said mount and the other end retained by a manually adjustable support, and a servo-motor operatively connected to said lever between said mount and said support, said servo-motor operating in response to a system that detects misalignment of said spectroscopic means.

11. In the combination of claim 10, said servo-motor being operatively connected to said lever through a spring.

12. In the combination of claim 10, said servo-motor driving a threaded shaft, an internally threaded block receiving said threaded shaft and operatively bearing against said lever.

13. Spectroscopic apparatus comprising, as components, excitation means for causing a chemical sample to emit characteristic radiation, monitor means including a single envelope tube having a pair of alternately bright regions when subjected to an alternating voltage for emitting monitor radiation, entrance means for said characteristic radiation and said monitor radiation, spectroscopic means for receiving said characteristic radiation and said monitor radiation from said entrance means, exit means for receiving said characteristic radiation dispersed into a spectrum from said spectroscopic means and automatic means responsive to said monitor radiation from said spectroscopic means for controlling selected relative orientations among said components in order to maintain said spectrum and said exit means in predetermined alignment.

14. Spectroscopic apparatus comprising, as components, excitation means for causing a chemical sample to emit characteristic radiation, monitor means including a single envelope mercury vapor discharge tube having a pair of serially connected filament portions that alternately emit monitor radiation by cathode glow when subjected to an alternating voltage, entrance means for said characteristic radiation and said monitor radiation, spectroscopic means for receiving said characteristic radiation and said monitor radiation from said entrance means, exit means for receiving said characteristic radiation dispersed into a spectrum from said spectroscopic means, and automatic means for controlling, in response to said monitor radiation from said spectroscopic means, selected relative orientations among said components in order to maintain said spectrum and said exit means in predetermined alignment.

15. Spectroscopic apparatus comprising a pair of electrodes for producing an electrical arc in order to excite a chemical sample to emit characteristic radiation, a diffraction grating, a first optical system for directing said characteristic radiation toward said diffraction grating, a source of radiation of given wave length comprising a gas discharge tube characterized by regions which emit radiation of alternately greater and lesser intensity, a second optical system for directing said radiation of given wave length toward said diffraction grating, said first optical system and said second optical system being predeterminedly related, a shield providing a plurality of slits for transmitting selected wave lengths of said characteristic radiation and said radiation of given wave length from said diffraction grating, a series of photoelectric cells for discriminatively receiving said radiation of selected wave lengths and said radiation of said given wave length from said slits, and an electrical system operatively connected with said photo-electric cells, said electrical system indicating the intensity distribution of said radiation of selected wave lengths and, in response to said radiation of given wave length controlling the mechanical relationships among said first optical system, said optical system, said diffraction grating and said shield.

No references cited.